United States Patent [19]

Piorek

[11] Patent Number: 4,947,763
[45] Date of Patent: Aug. 14, 1990

[54] TABLE WITH HEIGHT-ADJUSTABLE AND TILTABLE BOARD

[75] Inventor: Hans G. Piorek, Wiesbaden, Fed. Rep. of Germany

[73] Assignee: OKA-Bueromoebel Oskar Kasper, Bueromoebelfabrik, Marienberg, Fed. Rep. of Germany

[21] Appl. No.: 332,552

[22] Filed: Apr. 3, 1989

[30] Foreign Application Priority Data

Apr. 29, 1988 [DE] Fed. Rep. of Germany ... 8805679[U]

[51] Int. Cl.$^5$ ............................................. A47F 5/12
[52] U.S. Cl. ......................................... 108/8; 108/144
[58] Field of Search .................. 108/8, 6, 10, 96, 106, 108/144, 2; 248/371, 133, 372.1, 230, 251, 501

[56] References Cited

U.S. PATENT DOCUMENTS

| | | | |
|---|---|---|---|
| 623,786 | 4/1899 | Humphrey | 108/8 X |
| 855,354 | 5/1907 | Soucey | 108/8 X |
| 862,943 | 8/1907 | Swart | 108/8 X |
| 881,556 | 3/1908 | Dehler | 108/8 X |
| 1,295,680 | 2/1919 | Benson | 108/8 X |
| 1,341,988 | 6/1920 | Koechlin | 108/2 |
| 1,381,477 | 6/1921 | Laurl | 108/8 X |

FOREIGN PATENT DOCUMENTS

| | | | |
|---|---|---|---|
| 4331 | 10/1931 | Australia | 248/230 |
| 1526334 | 5/1968 | France | 248/371 |

Primary Examiner—Jose V. Chen
Attorney, Agent, or Firm—Spensley, Horn, Jubas & Lubitz

[57] ABSTRACT

The table is provided with vertical cheek elements (13) provided with arcuate guiding paths (15). Arcuate rods (16,17) glide within these guiding paths (15), their upper ends being pivotably connected with the board (14). One hinge (19) is a moveable hinge that allows to vary the distance between both hinges (18,19) corresponding to the position of the rods (16,17). If only one of the two rods (16,17) is shifted in its guiding path (15), the inclination of the board (14) will be changed. If this rod is subsequently fixed and the other rod is shifted, the board may be fixed on another level parallel to the first position. The table allows optional inclinations and changes of height of the board (14).

16 Claims, 4 Drawing Sheets

TABLE WITH HEIGHT-ADJUSTABLE AND TILTABLE BOARD

BACKGROUND OF THE INVENTION

1. Field of the Invention

The invention relates to a table with a height-adjustable and tiltable board.

2. Description of Related Art

Tables that are used as work tables or machine tables in offices, are often provided with boards adjustable in height and angle. However, the adjustment of these boards is difficult, since it has to be performed at both ends of the board, which requires the actuation of clamping devices and bears the risk of jamming when the board is lifted first at one lengthwise edge and then at the opposite lengthwise edge and then clamped to the stand. Thus, the height of the board can be adjusted in small steps only. If an adjustment of the tilt of the board is desired besides the height adjustment, this generally requires a complex tilting mechanism. Besides, a tilting mechanism often offers no firm clamping of the tilt, especially if there is an only clamping axis extending in the longitudinal central plane of the table.

It is an object of the invention to provide a table with a height-adjustable and tiltable board, wherein the adjusting mechanism allows a simpler adjusting of the height of said board and wherein a secure and firm support of the board is provided at two points spaced from the longitudinal central plane of the board, notwithstanding the possibility of tilting said board.

SUMMARY OF THE INVENTION

With the table according to the invention, each end of the board rests on two arcuate rods that rest in a curved guiding path of the cheek elements, so that the weight-loading of said board is distributed over the length of said guiding path. Angular forces can also be absorbed without causing substantial bending stresses to the rods. Both rods can be separately moved in said guiding path. Shifting only one of said rods will change the inclination of said board. If said rod is subsequently fixed and the other rod is shifted, the board may be fixed on another level but parallel to the first position. No jamming of the rods in the vertical plane of the cheek element will occur during these operations. Thus, adjusting the height may be performed by a single person, subsequently performing the individual clamping and loosening operations. The fact that the distance between both hinge points may be varied, allows said distance to be freely adjusted corresponding to the desired height of said board. Expediently, the hinge by which one rod is connected to said board is a fixed hinge, while the other is a moveable hinge that allows a limited horizontal displacement of the hinge point relative to the board.

The table may be used as a single table with two cheek elements and one board only, but it is also possible to form a combination of tables, wherein two adjacent boards are supported on an only cheek element. In this case, the cheek element has to be provided with at least two circular guiding paths, so that both boards may be independently adjusted.

In order to achieve a better mutual adaptation of said both rods for obtaining a horizontal orientation of said board, locking elements are preferably provided at each guiding path, which engage in holes in said rods. Thus, the rods are adjusted in locking steps, yet allowing to choose optional positions between two locking steps.

The following is a detailed description of an embodiment of the invention with reference to the drawings.

BRIEF DESCRIPTION OF THE DRAWINGS

In the Figures

DESCRIPTION OF THE PREFERRED EMBODIMENT

Figure 1:
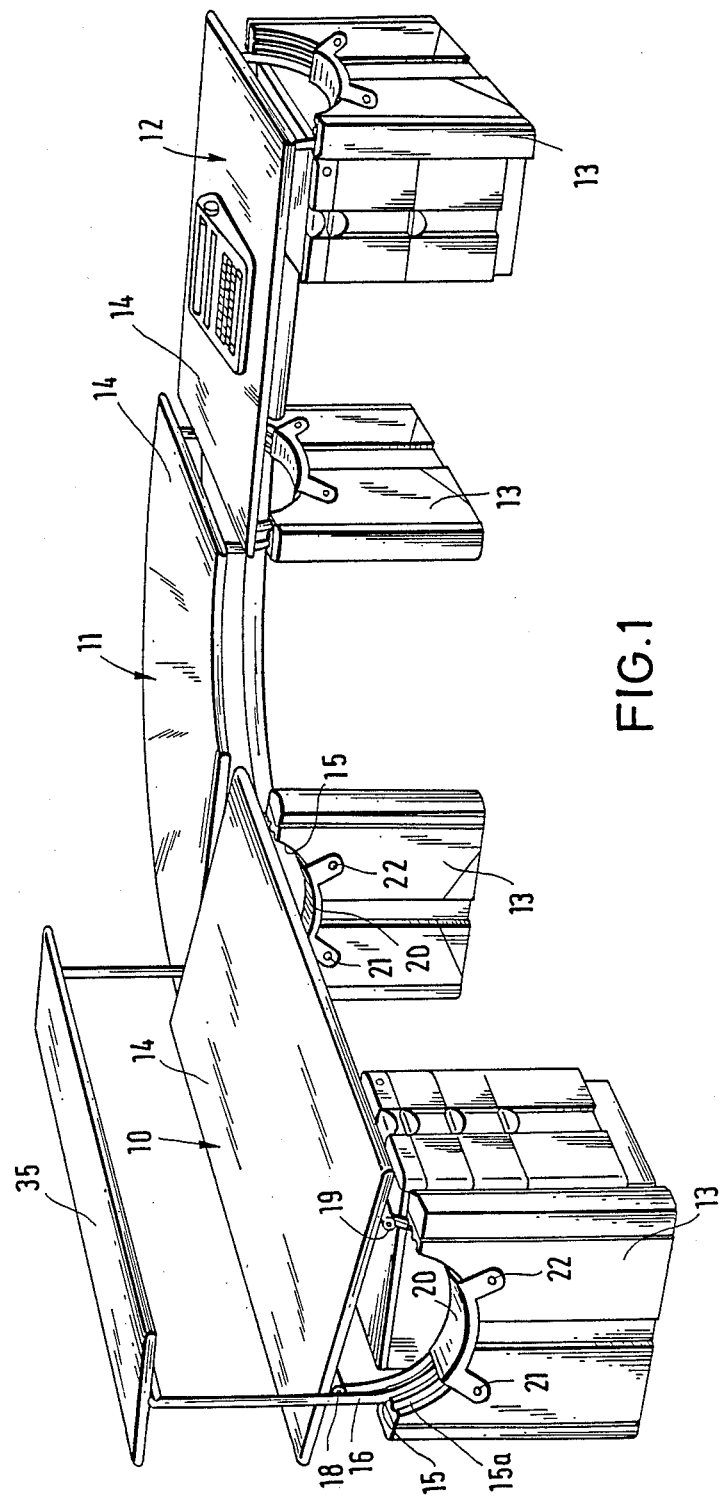
FIG. 1 is a perspective view of a table arrangement with a plurality of independently adjustable boards.

FIG. 1 shows a table combination for offices, a work table 10, a corner table 11 and a machine table 12 being combined. All three tables 10,11,12 are of the same basic structure, namely two mutually spaced cheek elements 13 that are not connected with each other, and a board 14 supported on said cheek elements 13. The boards of two adjacent tables are supported on the same cheek element 13 as described hereafter, so that a total of only four cheek elements 13 is required for said three boards.

Each cheek element 13 consists of a substantially rectangular block having its top provided with a semi-circular recess in which two semi-circular groove-shaped guiding paths 15, 15a extend. Each of said guiding paths 15, 15a lies in a vertical plane. The bottom of said board 14 is provided with two pivotably arranged curved rods 16, 17, the curvature of which is adapted to that of said semi-circular guiding path 15, so that said guiding path 15 may receive both rods 16, 17 that complementarily form a semi-circle. The upper end of rod 16 is fastened to the bottom of the board 14 by a fixed hinge 18, while the upper end of the other rod 17 is articulatedly mounted on said board 14 by a moveable joint 19. The term "moveable hinge" means that the axis of the hinge may move within a horizontal slot or elongated hole, so that the mutual distance of the axes of hinges 18 and 19 may adjust freely.

Both rods 16,17 may be fixed in said guiding path 15 by a clamping device 20. Said clamping device is provided with two tightening elements 21,22, each of which is arranged in the vicinity of a rod 16 or 17, respectively. Instead of a single clamping device 20, two separate clamping devices, each for one rod, may be provided.

Figure 2:
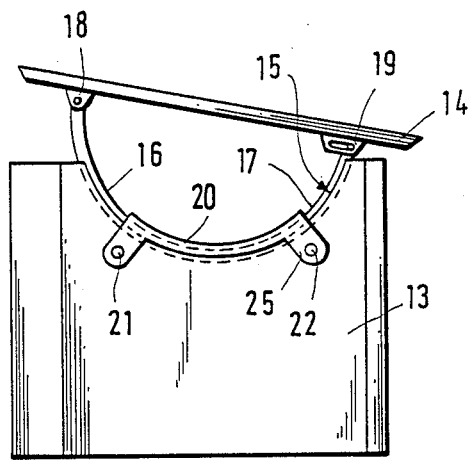
FIG. 2 is a front view of a table with a tilted board.

FIG. 2 illustrates the state in which one rod 17 is approximately in its lowest position in the respective guiding path 15 and in which the respective tightening element 22 is tightened, thus fixing said rod 17 in said guiding path 15. In this state, the board 14 may be lifted at its opposite longitudinal edge, so that rod 16 slides upward in said guiding path 15. Said rod 16 may now be fixed in any optional position by tightening the tightening element 21.

Figure 3:
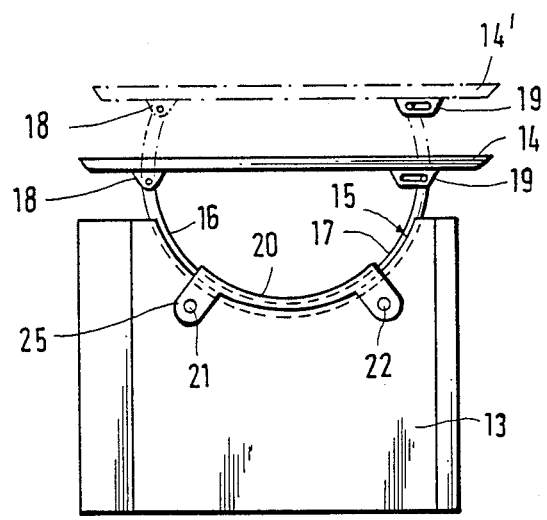
FIG. 3 is a front view with a height adjusted board.

The continuous lines in FIG. 3 illustrate the height of board 14 in its lowest position. If it is desired to elevate said board, one longitudinal side is elevated first, as shown in FIG. 2 and then, after the tightening of tightening element 21, tightening element 22 is loosened and the other longitudinal side is elevated by shifting up rod 17 in guiding path 15. In any case, rods 16 and 17 are in all-over contact with that portion of said guiding path 15 into which they plunge. This is due to the fact that the curvature of rods 16 and 17 is adapted to the curvature of said curved guiding path 15. In FIG. 3, the elevated state of board 14 is designated by the reference numeral 14'. The adaptation of the movement of the upper ends of rods 16, 17 to board 14 is achieved by means of the moveable hinge 19.

Figure 4:
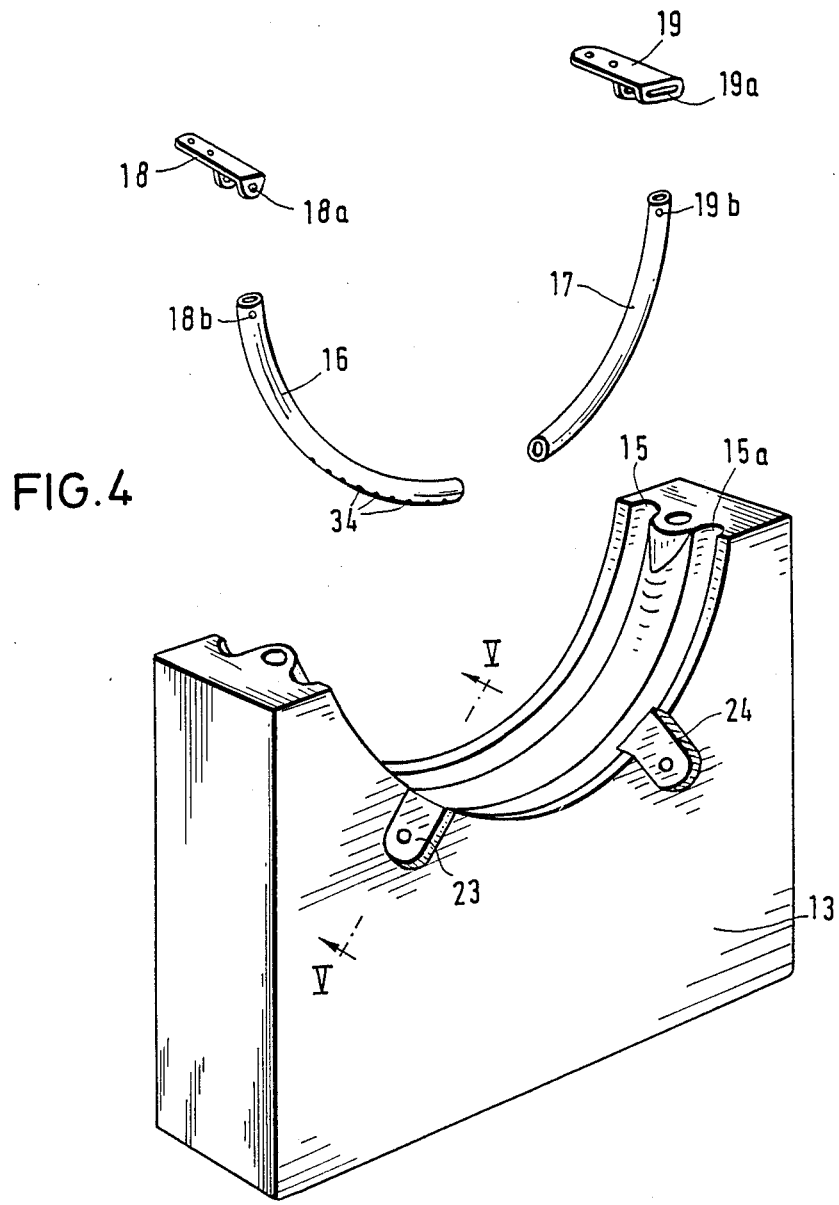
FIG. 4 is an exploded view of the structure of a cheek element.

FIG. 4 illustrates in particular said hinges 18 and 19 to be mounted on the bottom of said board, the fixed hinge 18 having two legs with round holes 18a for the pivot 18b of the hinge and the moveable hinge 19 having two legs with horizontal elongated holes 19a for the pivot 19b.

The outer side of the box-shaped cheek element 13 is provided with recesses 23,24 to receive the brackets 25 of the clamping device 20. Said recesses are provided with threaded bores 26 of a metal tube 27 extending within said cheek element 13. According to FIG. 5, said brackets 25 are fastened to cheek element 13 by means of screws 28 screwed into said threaded bores 26 of said pipe 27. Thus, said screws 28, together with brackets 25 form said tightening elements 21.

Figure 5:
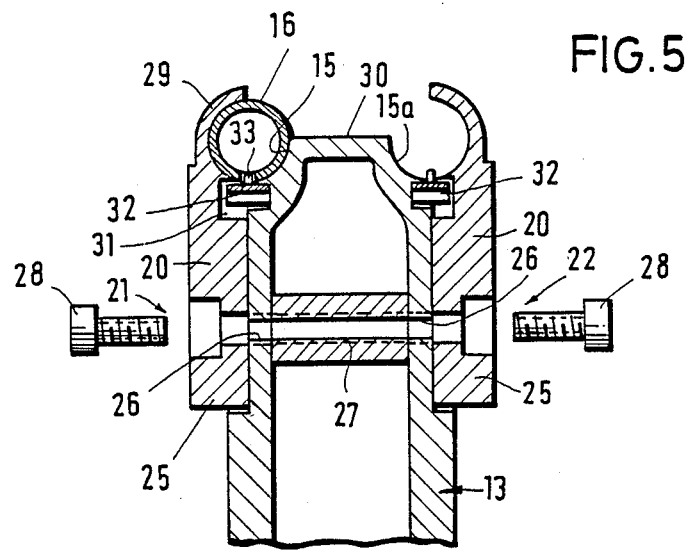
FIG. 5 is a section of the cheek element and the clamping devices along the line V—V in FIG. 4.
Figure 6:
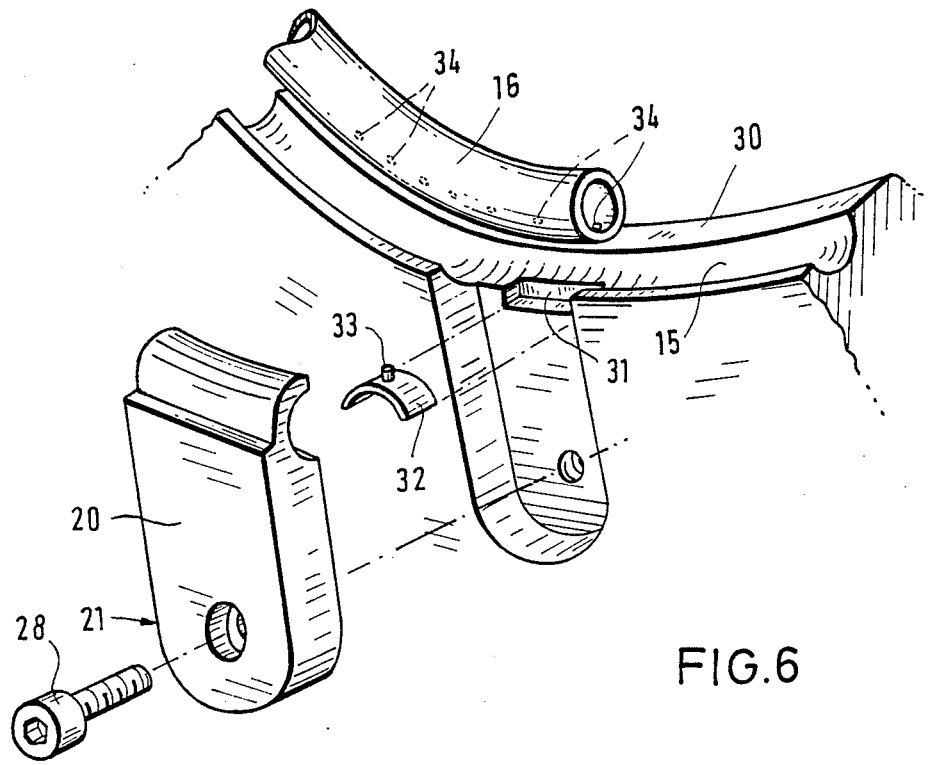
FIG. 6 is an exploded view of the clamping device with locking element.

As shown in FIG. 5, each guiding path 15, 15a consists of a half groove that encloses a quarter of the diameter of rod 16 which in this case is a round pipe. The clamping jaw 29 of said clamping device 20 contacts said rod 16 on the outside. Said clamping jaw 29 encloses the profile of rod 16 for another 180°, so that said guiding path 15 and said clamping jaw 29 enclose a total of 270° of the rod's circumference. By tightening the tightening device 21, clamping jaw 29 firmly presses rod 16 against said guiding path 15 opposite clamping jaw 29. Both guiding paths 15 and 15a are connected by a central ridge 30.

In the region of tightening element 21, guiding path 15 and bracket 25 are provided with complementary recesses 31 which accommodate an elastic locking element 32 in the form of a leaf spring having a mandrel 33 pointing upward. Both ends of said leaf spring are inserted into slots of guiding path 15 and said leaf spring is curved into said guiding path 15, so that it is curved against the bottom part of rod 16. Said mandrel 33 protrudes towards a row of holes 34 provided in the bottom of rod 16. If rod 16 is shifted in guiding path 15 after loosening said tightening element 21, said mandrel 33 may snap into each of said holes 34, so that certain locking positions are available to fix rod 16 in, thus facilitating the parallel alignment of the board.

The embodiment of FIG. 1 shows rod 16 elongated upward beyond said fixed hinge 18 to carry a tray 35 that is height-adjusted and tilted together with said board. Moreover, other auxiliary devices, e.g. lamps or the like, may be fastened at the clamping device 20 or the cheek element 13. Finally, said cheek element may also house electric wires and sockets, and cable channels may be fastened thereto.

The table according to the invention is particularly provided as a table for offices and it may be used as work table or as machine table, due to its height adjustability.

I claim:

1. A table with a height-adjustable and tiltable board, comprising:
    a supporting device of vertical cheek elements, each cheek element having a top and a semi-circular recess defining at least one semi-circular groove defining a guiding path extending longitudinally along the top of the cheek element, and at least two fixable rods fastened by two hinges to said board and guided in the guiding paths of said cheek elements, characterized in that
    said rods are circularly curved in a vertical plane,
    said guiding paths extend circularly in a vertical plane at each cheek element and have a circular contour for supporting at least a portion of each of said two rods, the rods are in pivotable engagement with one end of said board, and further comprising
    means for varying the distance between the two hinges.

2. The table according to claim 1, characterized in that the two rods are respectively guided in one of said guiding paths.

3. The table according to claim 1, characterized in that each cheek element has at least two adjacently extending guiding paths for two adjacent boards.

4. The table according to claim 1, characterized in that said guiding paths are provided in the top of said cheek elements.

5. The table according to claim 1, further comprising clamping devices provided with tightening elements that are accessible from a vertical side of said cheek element.

6. The table according to claim 1, characterized in that each guiding path is provided with an elastic locking element that engages in holes in said rods.

7. The table according to claim 1, characterized in that each guiding path extends semi-circularly and each rod is formed as a quarter of a circle.

8. The table according to claim 1, characterized in that one rod is fastened to said board by a fixed hinge and the other rod is fastened to said board by a moveable hinge.

9. A table having a height-adjustable, tiltable board, comprising:
    a pair of substantially arcuate rods, each of the pair of rods being connected to the board by a hinge, the hinges being spaced from one another by a relative distance,
    a cheek element having a top and a substantially semi-circular recess defining at least one substantially semi-circular groove defining a guide path extending longitudinally along the top of the cheek element, the substantially semi-circular guide path defining means configured to receive and support at least a portion of each of the arcuate rods, and
    means for varying the relative distance between the hinges.

10. A table according to claim 9, wherein the cheek element has at least two substantially adjacent guide paths arranged to support at least two substantially adjacent boards.

11. A table according to claim 9, wherein the cheek element has a top and wherein the guide path is provided in the top of the cheek element.

12. A table according to claim 9, further comprising a clamping means for clamping at least one of the pair of rods in the guide path.

13. A table according to claim 9, wherein at least one of the pair of rods has a hole therein and further comprising a locking element provided in the guide path and configured to engage the hole in the rod.

14. A table according to claim 9, wherein the guide path defines a substantially semi-circular arc and wherein each of the pair of rods defines an arc of approximately ninety degrees.

15. A table according to claim 9, wherein the hinge connecting one of the pair of rods to the board is a fixed hinge and wherein the hinge connecting the other one of the pair of rods to the board is a moveable hinge.

16. A table having a height-adjustable, tiltable board, comprising:
  a pair of substantially arcuate rods,
  hinge means for pivotally connecting each of the pair of rods to the board,
  a cheek element having a top and a substantially semi-circular recess defining at least one substantially semi-circular groove defining a guide path extending longitudinally along the top of the cheek element, the substantially semi-circular guide path defining means configured to receive and support at least a portion of each of the arcuate rods, the pair of rods defining a relative position in the guide path, and
  means for varying the relative position of the pair of rods in the guide path.

* * * * *